Aug. 8, 1950     C. E. MILLER     2,517,908
WORK SPINDLE WITH ECCENTRIC WORK SUPPORT
Filed Nov. 26, 1948     2 Sheets—Sheet 1
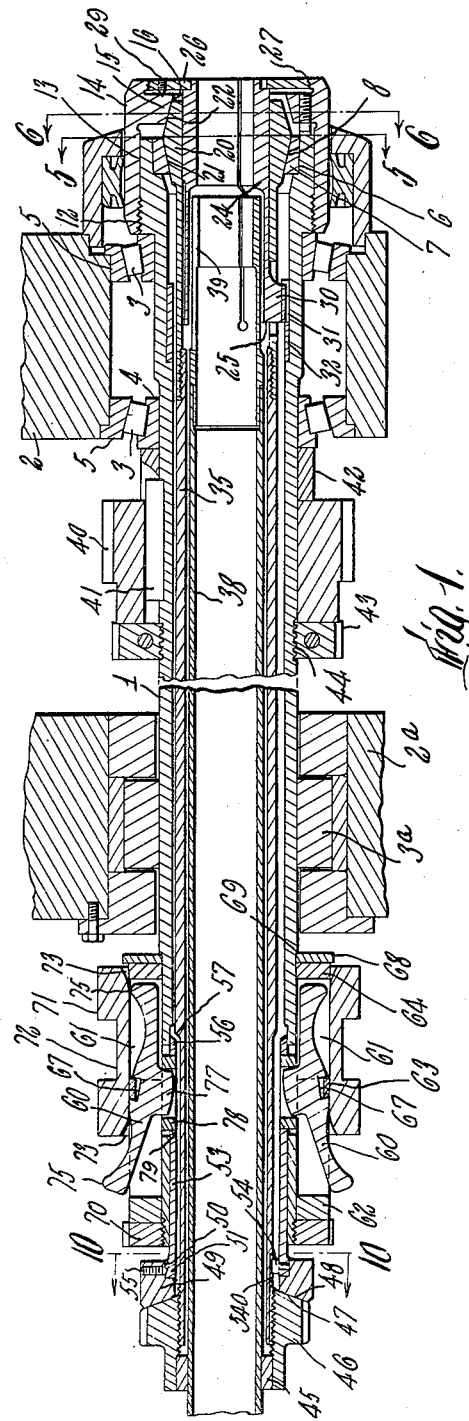
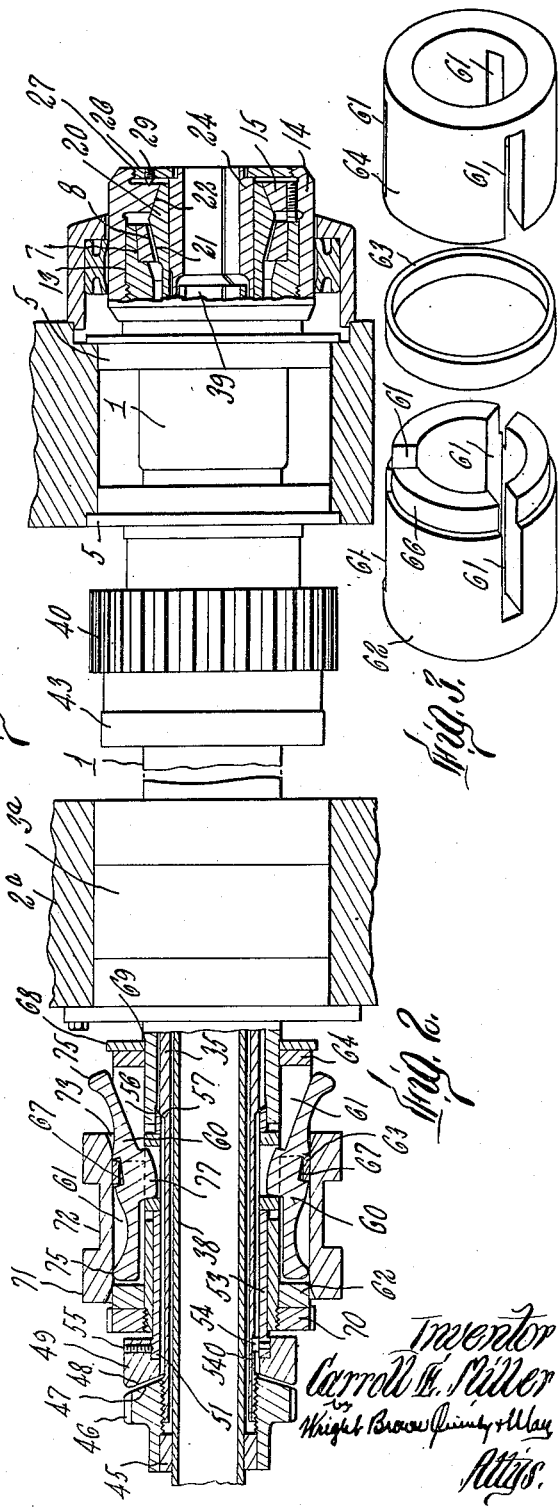

Aug. 8, 1950 — C. E. MILLER — 2,517,908
WORK SPINDLE WITH ECCENTRIC WORK SUPPORT
Filed Nov. 26, 1948 — 2 Sheets-Sheet 2
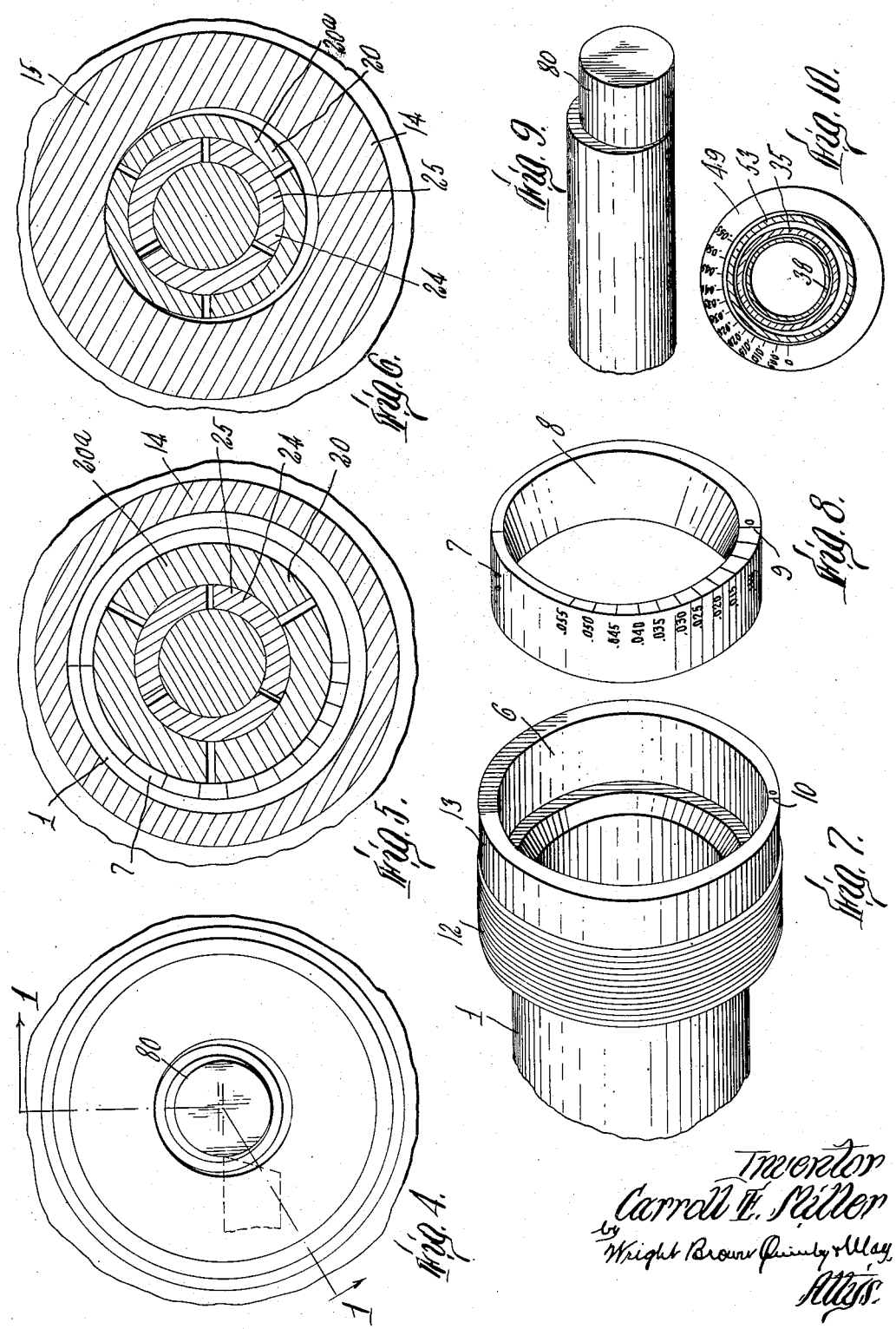

Patented Aug. 8, 1950

2,517,908

UNITED STATES PATENT OFFICE 2,517,908

WORK SPINDLE WITH ECCENTRIC WORK SUPPORT

Carroll E. Miller, Windsor, Vt., assignor to Cone Automatic Machine Company Inc., Windsor, Vt., a corporation of Vermont Application November 26, 1948, Serial No. 62,025

6 Claims. (Cl. 279—51)

It is sometimes desirable to perform machining operations on a cylindrical work piece eccentric to its axis and to perform other machining operations concentric to this axis. This invention has for an object, therefore, to provide a rotary work spindle having means by which stock or work may be held thereby in eccentric relation to its axis of rotation for certain operations and concentric to its axis of rotation for other machining operations.

The work spindle of this invention may, if desired, be employed in a multiple spindle lathe and it may be made adjustable to permit adjustment of the eccentricity from zero to a maximum.

Furthermore, as illustrated, the work may be clamped in either concentric or eccentric relation by mechanism which is moved lengthwise of the spindle from a mid-position in which the work is unclamped in either of opposite directions, motion in one direction being effective to clamp the work eccentric and motion in the other direction being effective to clamp the work concentric.

For a complete understanding of this invention, reference may be had to the accompanying drawings in which Figure 1 is a longitudinal central sectional view on line 1—1 of Figure 4 through a work spindle embodying the invention and showing the work clamp closed in eccentric relation but omitting the work.

Figure 2 is a view partly in the same section and partly in side elevation of the spindle showing the work clamp closed in concentric relation.

Figure 3 is an exploded isometric view of the cage which supports the clamp actuating levers.

Figure 4 is a front elevation of the spindle showing the work held eccentric to the axis of rotation.

Figures 5 and 6 are detail sectional views on lines 5—5 and 6—6, respectively, of Figure 1.

Figures 7 and 8 are isometric views showing certain of the eccentrically adjustable elements.

Figure 9 is a perspective view of the forward end of a piece of bar stock having its end portion eccentrically turned while being held in the work spindle adjusted for eccentric turning.

Figure 10 is a detail sectional view on line 10—10 of Figure 1.

Referring to the drawings, at 1 is shown a hollow work spindle suitably journaled at spaced points, one of them being in the frame 2, and as shown comprising spaced conical roller bearings 3, the inner races 4 of which are secured in spaced relation lengthwise of the spindle and the outer raceways 5 of which are secured in the frame 2. The work spindle may be rotated, and for this purpose it is shown as provided with a gear 40 keyed thereto through the key 41 and suitably clamped between a spacing ring 42 and a collar 43 threaded on a portion 44 of the spindle. A roller bearing 3a of conventional type supports the spindle in the frame member 2a spaced from the frame member 2. The forward end of the spindle 1 is provided with an eccentric internal bore 6 within which is angularly adjustably secured a ring or collar member 7. As shown best in Figures 1, 2 and 8, the member 7 is provided with a tapered bore 8, the bore 8 being concentric with the axis of the spindle 1 when the collar is assembled in the spindle in such angular relation that the zero mark 9 on the collar is presented in registry with the zero mark 10 on the spindle, in which position the eccentricities of the external face 7 of the collar and the internal face 6 are in opposite directions so as to neutralize each other. By adjusting the collar out of this angular relationship, the tapered bore 8 will be thrown out of concentric relation to the axis of the spindle by an amount shown on index markings which may be made on the periphery of the collar 7. For example, if the indication .050 of the collar 7 is positioned opposite to the zero mark 10 of the spindle, the tapered bore 8 is eccentric to the axis of the spindle by the amount of .050 inch. The external face of the collar 7 and the internal face of the counterbored portion 6 may be slightly tapered so that when the collar is inserted in the desired angular position it is held firmly fixed in this adjusted position. It may be removed at any time to change its adjusted angular position by inserting a hook element through the bore 8 and engaging it on the rear face of the collar 6 and pulling forwardly to release the collar 7 from its clamped position.

Assuming that the collar 7 has been adjusted to the desired degree of eccentricity and is in position, its tapered face 8 is effective in producing a clamping action of the work in the desired eccentric relation as will later appear. As shown the forward enlarged diameter end portion 13 of the spindle 1 is externally threaded as at 12 toward its rear end and in engagement with these threads is the rear internally threaded portion of a sleeve 14 which has adjacent to its forward end an inwardly extending annular flange 15 having a conical face 16 at its inner edge concentric to the spindle axis when the sleeve 14 is assembled on the spindle. This face 16, being concentric with the spindle axis, forms one portion of a clamping mechanism for clamping the work concentric to the spindle.

Cooperating with the internal faces 8 and 16 is a collet member 20, its spring jaws 20a having reversely tapered concentric outer faces 21, 22. These faces are so arranged that in an intermediate axial position of the collet 20 with relation to the faces 8 and 16, its faces 21 and 22 are out of close engagement therewith, this corresponding to work released position of the collet 20. The work itself is directly clamped between springs jaws 24 of a spring collet 25 and with which the jaws of the collet member 20 engage. This collet 25 is held in position within the spindle by means of a ring 26 externally threaded and engaging internal threads in a counterbored end portion 27 of the sleeve 14, and it is held against removal from the member 14 as by means of a set screw 29 threaded therethrough and having a point indenting the flange member 15 of the member 14.

The clamping collet 24 is keyed against rotation with respect to the spindle. For this purpose, it has a lug 30 at its rear end engaging in a slot 31 in a liner sleeve 32 carried by the spindle 1.

The axially movable collet 20 is threaded at its rear end over the forward extremity of an actuating sleeve 35 and it will be evident that by axial motion imparted to the sleeve 35, the collet 20 may be moved axially, moving it inwardly or to the left, bringing its tapered face 21 against the inner eccentric tapered face 8 and springing the jaws 21 inwardly to grip the work eccentric with the spindle axis, while by moving the member 20 in the opposite direction, or to the right, its tapered face 22 may be brought into engagement with the concentrically tapered face 16, thus forcing the jaw members 24 inwardly against the work in concentric relation to the work axis.

Where the work comprises bar stock which extends through the spindle, means may be provided for holding the stock concentric while the forward end is held concentric, and eccentric while the forward end is held eccentric, but it will be understood that the holding of the work piece toward the rear end of the spindle in definite relation to the spindle axis is not so critical as at the forward end. The work piece itself extends through the usual pusher tube 38 which has at its forward end a spring work gripper having spring jaws 39. This work gripper tube 38 may be moved axially to feed the work toward the forward end of the spindle during the time that the work is released between the collet jaws 24 and while these collet jaws 24 are closed the tube 38 may be retracted on the work piece, preparatory to a succeeding work feeding operation while the collet jaws 24 are in work-releasing condition. Means for actuating this feed tube form no part of the present invention and will therefore not be further described herein.

The rear end of the feed or pusher tube 38 is slidably mounted through a bushing 45 held within the bore of an abutment collar 46 having a concentrically tapered forward face 47. This abutment 46 is threaded onto the rear end of the collet actuating sleeve 35 and its tapered forward face 47 may be engaged at suitable times by a reversely tapered face 48 on a ring 49. This ring 49 has a counterbored inner face portion 50 which is eccentric and is mounted on an eccentric enlarged face 51 of a sleeve 53 which is held against rotation with respect to the sleeve 35 by a pin 54 thereof riding in a by-way 540 in the sleeve 35. The ring 49 may be fixed in adjusted angular position as by the set screw 55 to determine the eccentricity of its face 48 to the axis of the spindle similarly to the eccentric adjustment of the ring 7 at the forward end of the spindle, and preferably this adjustment should be the same at both ends, though as before noted, the eccentric adjustment at the rear end is not so critical as at the forward end. When the ring 49 is pressed into engagement with the collar 46, this eccentric adjustment is effective to eccentrically hold the adjacent portion of the pusher tube 38 through which the stock extends, but this engagement of the ring 49 on the collar 46 is produced only when the collet 20 is pushed rearwardly so that the forward portion of the stock is clamped eccentrically, this being because the motion to the left of the collet 20 is produced by pressure of the ring 49 against the collar 46. When the collet 20 is moved to the right into the position shown in Figure 2, the ring 49 is out of contact with the collar 46 as thus shown.

The sleeve 53 has a forward end portion 56, which, when it is moved to the right, impinges upon an annular shoulder 57 on the collet actuating sleeve 35 and produces the movement to the right of this sleeve which brings the concentric tapered face 22 into engagement with the concentric tapered face 16 and is effective to clamp the work concentric to the spindle axis.

The motion of the sleeve 57 either in a left hand direction to bring the ring 49 into engagement with the collar 46, or in the right hand direction to bring its forward end 56 into engagement with the shoulder 57 of the sleeve 35, is produced by the rocking of a plurality of levers 60 which are arranged angularly about the spindle toward its rear end. These levers 60 are arranged in slots 61 lengthwise through a cage which comprises the members 62, 63 and 64 shown detached in Figure 3. Each of the members 62 and 64 comprises a sleeve having the slots 61 extending from their adjacent ends toward their remote ends, the slots of these members registering at their adjacent ends, and within which the levers 60 are positioned. The slotted end of one of these elements, as 62, is reduced in diameter as at 66 for the reception of the ring element 63. This ring element engages in notches 67 in the outer faces of each of the levers 60 substantially midway of their lengths and provides a fulcrum about which these levers may rock.

The cage comprising these three members 62, 63 and 64 is fixed to the spindle, being pressed against a washer 68 seated against an annular shoulder 69 on the spindle by a nut 70 threaded on the rear end of the spindle and engaging against the rear face of the member 62. Slidable axially on this cage is a spool member 71 provided with a peripheral groove 72 which may be engaged by any suitable actuating member by which the spool may be moved axially along the cage. The bore of the spool 71 flares at opposite ends as at 73 and forms cam surfaces which may engage with the outwardly curved ends 75 of the levers 60. These levers are so proportioned that when the spool is in its right hand position shown in Figure 1, the right hand ends 75 of the levers are enclosed by the spool 71 somewhat inwardly of the flared faces 73 in position to hold the levers in the position shown in Figure 1. Inwardly projecting arms 77 from these levers ride in rectangular sockets 78 set into the sleeve 53 and extending through slots 79 through the spindle 1, and in the retracted position of Figure 1 the ring 49 presses rearwardly against the collar 46 and holds the collet 20 retracted into eccentric work-clamping position. When the spool 71 is retracted toward the position shown in Figure 2 it passes through an intermediate position (not shown) where the arms 77 are in mid-position with the collet 20 in mid or neutral position, releasing the work from clamping engagement. As the spool 71 is moved further to the left into the position shown in Figure 2, the left hand ends 75 of these levers are wedged inwardly within the spool and the right hand ends 75 are allowed to project outwardly. With the parts in this position the actuating sleeve 53 is in its right hand position, separating the ring 49 from the collar 46 and causing the collet 20 to be moved into cooperative relation to the flange 15 thus to clamp the work in concentric position.

From the foregoing it will be seen that certain machining operations can be carried on with the work in concentric position with relation to the spindle axis and other operations can be carried on with the work in eccentric relation to the spindle axis. For example, as shown in Figure 9, this permits an end portion 80 of the work to be machined about an axis eccentric to the rear portion of the work while the work is clamped eccentric and permits another portion of the work piece to be machined concentric while the work is clamped concentric. Any suitable means may be provided for moving the spool, such, for example, as cam means such as are commonly employed where actuating spools are arranged to clamp or release work pieces by axial motion along the spindle.

From the foregoing description of certain embodiments of this invention, it should be evident to those skilled in the art that various changes and modifications may be made therein without departing from its spirit or scope.

I claim:

1. A rotary work spindle having work clamping means, a pair of elements actuable to clamp said means, portions of the elements of said pair being arranged to actuate said clamping means with the work concentric with the axis of said spindle and other portions of said elements of said pair being arranged to actuate said clamping means with the work eccentric to said spindle axis by a predetermined amount, and means for selectively actuating said elements so that either or neither of said portions is effective.

2. A rotary work spindle having a spring gripping element provided externally with a pair of oppositely directed tapered external faces, a sleeve within which said element is positioned and provided with spaced matingly tapered faces arranged to cooperate with the tapered faces of said element to close said element on relative motions between said sleeve and element in opposite directions from an intermediate released position, one of said tapered sleeve faces being arranged concentric to the axis of said spindle and the other of said tapered sleeve faces being arranged eccentric to said shaft axis, and means actuable to move said sleeve and element axially from an intermediate neutral position where said element is in work-released condition to either selected of a pair of clamping conditions in one of which said concentric tapered face is effective to produce concentric work clamping and in the other of which said eccentric tapered face is effective to produce eccentric work clamping.

3. A rotary work spindle provided with work-clamping means, actuating means for said clamping means including a sleeve movable lengthwise of said spindle and operatively connected to said clamping means and having an intermediate position in which work in said spindle is released and positions at each side of said intermediate position in which the work is gripped by said clamping means, and means for forcing said sleeve in either selected direction from said intermediate position.

4. A rotary work spindle provided with work-clamping means, actuating means for said clamping means including a sleeve movable lengthwise of said spindle and operatively connected to said clamping means and having an intermediate position in which work in said spindle is released and positions at each side of said intermediate position in which the work is gripped by said clamping means, a collar fixed to said spindle, an actuating sleeve movably carried by said spindle and having an eccentric portion at one end, a ring fixed to said actuating sleeve and having an eccentric bore angularly adjustable on said eccentric portion into and out of concentric relation with said spindle, a lever rockably carried by said spindle and engaging said actuating sleeve to move said actuating sleeve lengthwise of said axis as said lever is rocked, said ring having a tapered outer face, an abutment carried by said first mentioned sleeve and having a reversely tapered face to said ring face and into engagement with which said ring may be moved by the rocking of said lever from an intermediate position in one direction, said actuating sleeve having an end portion engaging and moving said first mentioned sleeve in the opposite direction by rocking of said lever from said intermediate position in the opposite direction.

5. A rotary work spindle provided with work-clamping means, actuating means for said clamping means comprising a sleeve movable lengthwise of said spindle and operatively connected to said clamping means, a cage fixed to said spindle and having lengthwise slots therethrough, a lever fulcrumed in each of said slots and having an arm operatively engaging said sleeve to move said sleeve lengthwise of said spindle by rocking of said levers, and a spool mounted for axial motion on said cage and engageable with end portions of said levers to rock said levers by axial motion of said spool.

6. A rotary work spindle provided with work-clamping means, actuating means for said clamping means comprising a sleeve movable lengthwise of said spindle and operatively connected to said clamping means, a cage fixed to said spindle and comprising a pair of endwise positioned sleeves slotted inwardly from the adjacent ends in registering relation, a ring carried by one of said cage sleeves adjacent to the other cage sleeve, a lever in each pair of registering slots and having a slot intermediate to its ends on its outer face for said ring, said ring forming a fulcrum for each of said levers, each of said levers having an arm operatively engaging said actuating means sleeve to move said actuating means sleeve lengthwise of said spindle by rocking of said levers, and a spool mounted for axial motion on said cage and engageable with end portions of said levers to rock said levers by axial motion of said spool.

CARROLL E. MILLER.

REFERENCES CITED

The following references are of record in the file of this patent:

UNITED STATES PATENTS

| Number | Name | Date |
|---|---|---|
| 981,566 | Harvis | Jan. 10, 1911 |
| 1,979,366 | Cone | Nov. 6, 1934 |
| 2,153,971 | Montgomery | Apr. 11, 1939 |
| 2,252,840 | Drissner | Aug. 19, 1941 |
| 2,456,776 | Faust | Dec. 21, 1948 |
| 2,463,857 | Dietz | Mar. 8, 1949 |